United States Patent [19]
Ueda et al.

[11] Patent Number: 4,926,306
[45] Date of Patent: May 15, 1990

[54] ELECTRIC POWER CONVERTER

[75] Inventors: Shigeta Ueda, Hitachi; Mitsuyuki Hombu, Katsuta; Kazuo Honda, Hitachioota; Daisaku Morinaga, Hitachi, all of Japan

[73] Assignee: Hitachi, Ltd., Tokyo, Japan

[21] Appl. No.: 389,295

[22] Filed: Aug. 3, 1989

[30] Foreign Application Priority Data

Aug. 12, 1988 [JP] Japan .................................. 63-199904

[51] Int. Cl.⁵ .......................................... H02H 7/122
[52] U.S. Cl. ....................................... 363/58; 363/137
[58] Field of Search ............... 363/135, 136, 137, 138, 363/55, 56, 57, 58

[56] References Cited

U.S. PATENT DOCUMENTS

| | | | |
|---|---|---|---|
| 3,872,372 | 3/1975 | Kautz et al. | 363/137 |
| 4,611,267 | 9/1986 | McMurray | 363/58 |
| 4,686,618 | 8/1987 | McMurray | 363/137 |
| 4,710,862 | 12/1987 | Asaeda | 363/58 |
| 4,763,239 | 8/1988 | Ball | 363/58 |
| 4,853,835 | 8/1989 | Furuhashi | 363/58 |
| 4,855,893 | 8/1989 | Kratz | 363/58 |

OTHER PUBLICATIONS

Salzmann et al., "Progress in Voltage Source Inverters (VSIs) and Current Source Inverters (CSIs) with Modern Semiconductor Device", IEEE, IAS, Conference Record of Annual Meeting (1987) pp. 577 to 583.

Heumann et al., "Switching Losses and Operational Frequency Limitations of GTO Thyristors in PWM Inverters", PESC '88 Record (Apr. 1988), pp. 921-927.

*Primary Examiner*—Peter S. Wong
*Attorney, Agent, or Firm*—Antonelli, Terry, Stout & Kraus

[57] ABSTRACT

A power converter comprising: a three phase bridge circuit, each phase of which is composed of series-connected positive and negative arms, each of which arms includes series-connected GTOs; free-wheel diodes coupled in reverse parallel with every GTO; phase snubber circuits provided for every phase, each of which includes series-connected diodes coupled across the series-connected arms through a first capacitor, a junction of the diodes being coupled to a junction of the series-connected arms through a second capacitor and a junction of the first capacitor and the series-connected diodes being coupled to a negative dc terminal through a resistor; and individual snubber circuits provided in the respective GTOs, each of which includes a series connection of a diode and a third capacitor as well as a resistor connected in parallel with the diode; in which the first capacitor has capacitance much larger than the second capacitor, which in turn has capacitance much larger than the third capacitor.

15 Claims, 9 Drawing Sheets

ELECTRIC POWER CONVERTER

BACKGROUND OF THE INVENTION

1. Field of the Invention

The present invention relates to an electric power converter suited for converting heavy electric power, and especially to a large capacity power converter with improved snubber circuits.

2. Description of the Related Art

A voltage source inverter, which comprises a three-phase bridge circuit employing gate turn-off thyristors (GTOs) and snubber circuits provided across a positive arm and a negative arm of every phase, is discussed in the article "PROGRESS IN VOLTAGE SOURCE INVERTERS (VSIs) AND CURRENT SOURCE INVERTERS (CSIs) WITH MODERN SEMICONDUCTOR DEVICES" by T. Salzmann et al, IEEE, IAS, Conference Record of Annual Meeting (1987), pages 577 to 583. A snubber circuit as disclosed in this article is known as the Marquard low-loss snubber circuit. However, this article only discusses the case, in which the Marquard low-loss snubber circuit is applied to a three-phase bridge circuit, each arm of which is composed of a signal GTO.

As is well know, in a large capacity power converter, each of arms thereof has some GTOs connected in series. In such a case, when one of the arms is commutated to another arm, all of GTOs in the one arm are not always turned off simultaneously because of the difference in turn-off time characteristics thereof. Namely, there can often occurs the case where one of GTOs of an arm still remains conductive, whereas another GTO of the arm has been already turned off.

Under such a circumstance, equivalent capacitance of the another GTO is charged by a current which still flows through the one GTO due to inductance of a wiring of the arm. Since such equivalent capacitance is usually very small, the voltage appearing across the another GTO rapidly increases and may result in an overvoltage, before the one GTO is turned off.

Therefore, the prior art snubber circuit as mentioned above is not suited or insufficient for use in such a large capacity power converter that each arm of the converter is composed of plural GTOs connected in series.

SUMMARY OF THE INVENTION

An object of the present invention is to provide an electric power converter, each arm of which is composed of plural switching elements connected in series, in which there is eliminated the above mentioned problem caused by the difference in the turn-off time among the series-connected switching elements, and electric power lost in snubber circuits provided in the power converter can be reduced as much as possible.

A feature of the present invention resides in an electric power converter having a bridge circuit of plural phases, which includes plural rectifying branches corresponding to the respective phases, which are coupled in parallel across dc terminals of the bridge circuit, wherein each of the rectifying branches comprises: a first arm and a second arm, both including switching elements, which are connected in series with each other, in which a junction of the series-connected arms is coupled to one of ac terminals of the bridge circuit; free-wheel diodes coupled in reverse parallel with the respective switching elements of the first and second arms; and a phase snubber circuit provided with a series connection of first and second diodes coupled across the series-connected arms through a first capacitor, in which a junction of the first and second diodes is coupled to the junction of the series-connected arms through a second capacitor and a junction of the first capacitor and the series-connected first and second diodes is coupled to one of the dc terminals through a discharge path, through which charge stored in the first capacitor is discharged; characterized in that the arms of each rectifying branch include plural switching elements connected in series, respectively, and each of the switching elements is provided with an individual snubber circuit including a third capacitor being charged during turn-off of a corresponding switching element and a resistor for consuming charge discharged from the third capacitor during turn-on of the corresponding switching element, wherein the first capacitor has capacitance much larger than the second capacitor, which in turn has capacitance much larger than the third capacitor.

According to one of embodiments of the present invention, the discharge path of the first capacitor comprises power recovery means including a transformer, a primary winding of which is connected between the junction of the first capacitor and the series-connected first and second diodes and one of the dc terminals and a second winding thereof is connected across the dc terminals through a diode. With this, the electric power lost in the snubber circuits can be further reduced.

DESCRIPTION OF THE PREFERRED EMBODIMENTS

In the following, description will be made of embodiments according to the present invention, with reference to accompanying drawings Referring at first to FIG. 1, there is shown an overall configuration of a three-phase power converter according to an embodiment of the present invention. In the figure, reference numerals 1 and 2 denote dc terminals, i.e., a positive terminal and a negative one, of the power converter, to which dc buses 3 and 4 are coupled, respectively.

Across the dc buses 3, 4, there are provided rectifying branches 5, 8, 11 for the respective phases through reactors 6, 7 and 9, 10 and 12, 13, respectively. As is well known, these reactors function so as to limit the undesirably rapid increase of current flowing through the respective rectifying branches. Every rectifying branch 5, 8, 11, although it will be detailed later, is composed of a pair of a positive arm and a negative arm, which are connected in series with each other, and each arm includes plural gate turn-off thyristors (GTOs) connected in series and other necessary components. Junctions 14, 15, 16 of the series-connected positive and negative arms for the respective phases are coupled to ac terminals 17, 18, 19, respectively, so that a three-phase bridge converter is constructed.

When the power converter as shown is used as an inverter for inverting dc power to ac power, a dc power source is coupled across the dc terminals 1, 2, and an ac load, such as a three-phase induction motor, is coupled to the ac terminals 17, 18, 19. Contrary, when it is used as a converter for converting ac power to dc power, an ac power source is coupled to the ac terminals 17, 18, 19 and a dc load is coupled across the dc terminals 1, 2.

Figure 1:
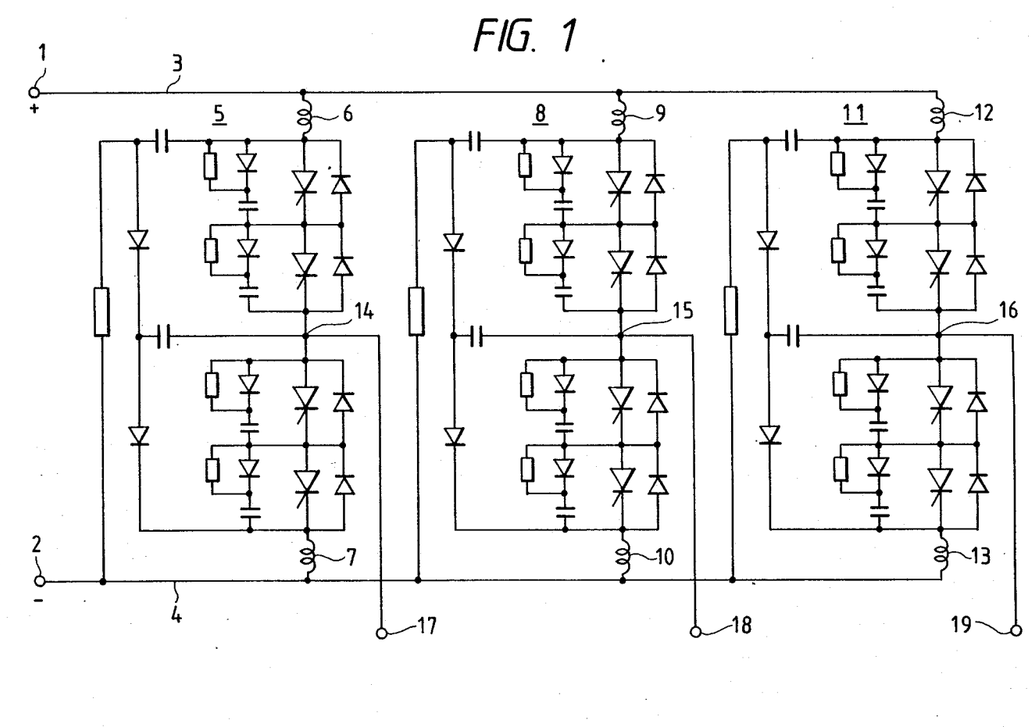
FIG. 1 schematically shows an overall configuration of a three-phase power converter according to an of the present invention.
Figure 2A:
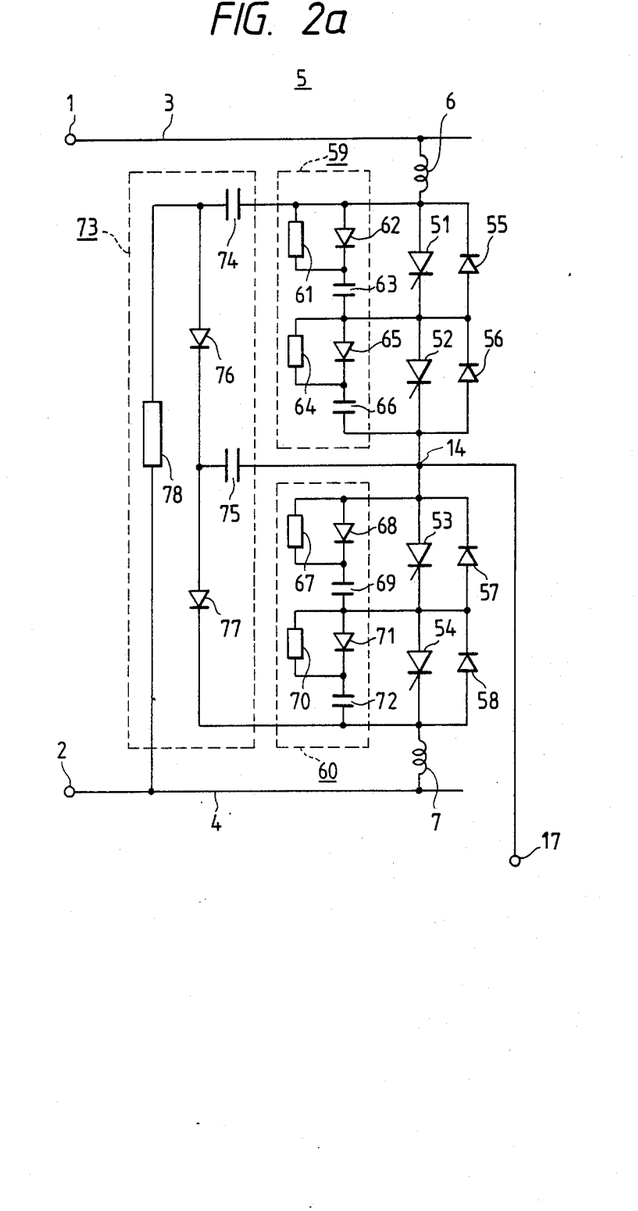
FIGS. 2a and 2b are drawings for explaining a detailed construction of a rectifying branch for every phase of the three-phase converter as shown in FIG. 1.

Referring next to FIG. 2a, there will be explained the detailed construction of the rectifying branch of each phase. As will be obvious from FIG. 1, every rectifying branch 5, 8, 11 has the same construction, and therefore FIG. 2a representatively shows the detailed construction of one of them.

As shown in the figure, a positive arm of the rectifying branch 5 includes GTOs 51, 52 connected in series, and free-wheel diodes 55, 56 are connected in reverse parallel with the GTOs 51, 52, respectively. Further, individual snubber circuits, which are generally represented by reference numeral 59, are provided for the GTOs 51, 52, individually.

An individual snubber circuit provided for the GTO 51 comprises a series connection of a diode 62 and a capacitor 63 as well as a resistor 61 connected in parallel with the diode 62. An individual snubber circuit for the GTO 52 has the same configuration as that for the GTO 51, and therefore further description thereof is omitted.

A negative arm of the rectifying branch 5 has the same configuration as the positive arm as described above. Namely, it includes GTOs 53, 54, and free-wheel diodes 57, 58 are connected in reverse parallel therewith. Further, individual snubber circuits generally represented by reference numeral 60 are provided for the GTOs 53, 54, respectively. Also the individual snubber circuits 60 have the same configuration as the individual snubber circuits 59.

The thus constructed positive and negative arms are coupled in series with each other by connecting a cathode of the GTO 52 and an anode of the GTO 53. A junction 14 of this series connection is coupled to the ac terminal 17.

The rectifying branch 5 is provided with another snubber circuit 73 across the series-connected positive and negative arms. Namely, there is provided a series connection of diodes 76, 77 across the series-connected positive and negative arms through a capacitor 74. A junction of the series-connected diodes 76, 77 is coupled to the junction 14 through a capacitor 75. A junction of the capacitor 74 and the series-connected diodes 76, 77 is coupled to the negative bus 4 through a resistor 78. As will be apparent from the description later, the resistor 78 forms a discharge path for charge stored in the capacitor 74.

For the convenience of the following description, the another snubber circuit 73 as described above will be called a phase snubber circuit, compared with the snubber circuits 59, 60 individually provided for every GTO, because the former is provided across a series connection of positive and negative arms for every phase.

Figure 2B:
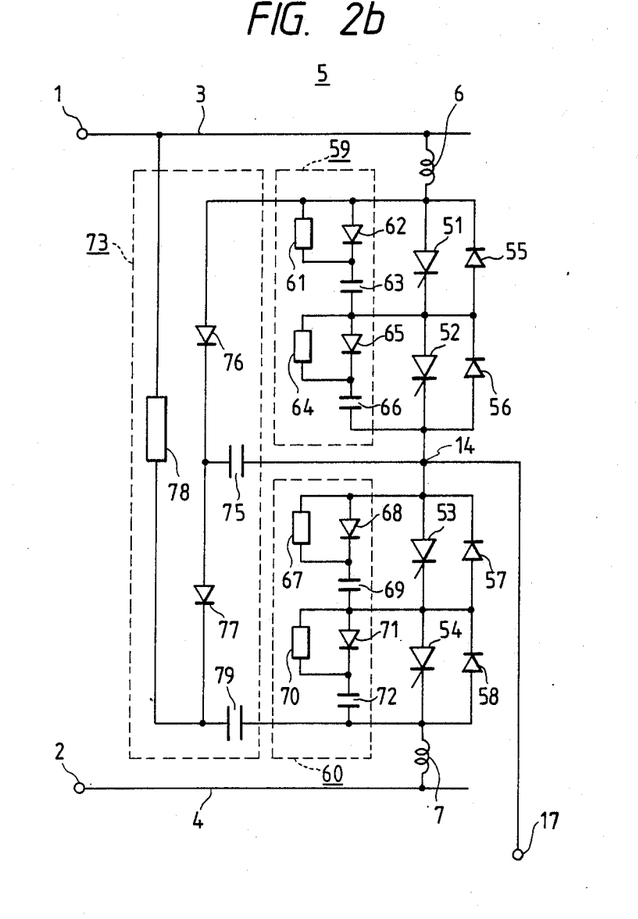

In FIG. 2b, there is shown another example of the construction of the rectifying branch 5. The difference thereof from that of FIG. 2a resides only in the construction of the phase snubber circuit 73. Namely, in this figure, there is provided the series connection of the diodes 76, 77 across the series-connected positive and negative arms through a capacitor 79. A junction of the capacitor 79 and the series-connected diodes 76, 77 is coupled to the positive bus 3 through the resistor 78. The junction of the series-connected diodes 76, 77 is coupled to the junction 14 through the capacitor 75 in the same manner as in FIG. 2a.

Next, the operation of the rectifying branch 5 will be explained, referring to FIGS. 3a to 3d. The rectifying branch 5 of FIG. 2b is somewhat different in its operation from that of FIG. 2a, but both are essentially the same. Although the difference will be described as needed, the following explanation will be done on the basis of the rectifying branch 5 of FIG. 2a.

In the following, it is assumed that the power converter as shown in FIG. 1 operates as an inverter. Therefore, a dc power source is coupled with the dc terminals 1, 2 made positive and negative, respectively, and a three-phase ac load is coupled to the ac terminals 17, 18, 19. Further, FIGS. 3a to 3d show the change of the current flow when current flowing through the GTOs 51, 52 is commutated to the GTOs 53, 54. In the figures, however, the reactors 6, 7 are omitted and only pertinent portions are illustrated, for purpose of brevity.

Figure 3A:
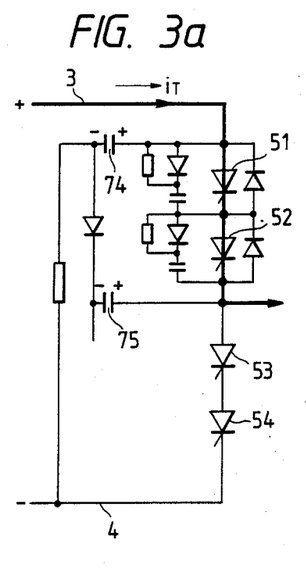
FIGS. 3a to 3d are drawings for explaining the operation of the commutation of current from a positive arm to a negative arm in the rectifying branch.

When the GTOs 51, 52 are rendered conductive, current $i_T$ flows from the dc power source to the ac load through the positive bus 3 and the GTOs 51 and 52, as shown by a thick line in FIG. 3a. In this case, the capacitors 74, 75 of the phase snubber circuit 73 are already charged in the direction as shown during a previous cycle of the operation.

Under these conditions, let us assume that turn-off signals are applied to the GTOs 51, 52 simultaneously, but nevertheless the GTO 51 is turned off with some delay from the GTO 52 because of their turn-off time characteristic. Namely, although the GTO 52 is turned off at once, the GTO 51 still remains conductive for a while. As a result, the current $i_T$, which flows through the GTOs 51, 52 just before the commutation operation thereof, flows separately through two circuits, as shown by thick lines in FIG. 3b.

Figure 3B:
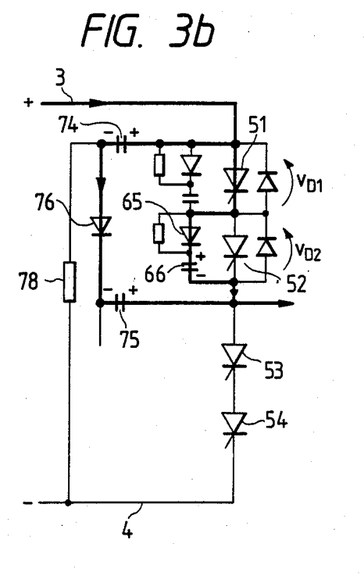

A part of the current $i_T$ flows through from the dc power source to the ac load through the positive bus 3, the capacitor 74, the diode 76 and the capacitor 75, and a remaining part thereof flows through the GTO 51, which is still conductive, the diode 65 and the capacitor 66. Consequently, the capacitor 74 is further charged, and the capacitor 75 discharges toward the ac load. Since the energy discharged from the capacitor 75 is supplied to the ac load, it never becomes loss. Further, the capacitor 66 is charged in the direction as shown.

Figure 3C:
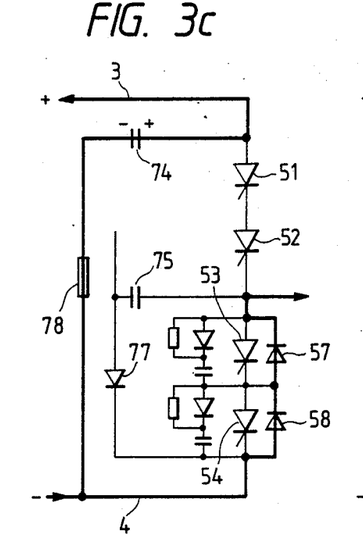

After the GTO 51 is completely turned off, there occur current flowing toward the ac load through the free-wheel diodes 57, 58 and current flowing toward the dc power source through the capacitor 74 and the resistor 78, as shown by thick lines in FIG. 3c. The former is a current caused by inductance of the ac load, and the latter is a discharge current of the capacitor 74 which is overcharged during the state as shown in FIG. 3b.

This discharge current continues to flow until a voltage appearing across the series connection of the capacitor 74 and the resistor 78 becomes equal to the voltage of the dc power source. Further, although the energy of the discharge current is consumed by the resistor 78, the power loss caused thereby is small, because the amount of overcharge of the capacitor 74 is not large originally.

Figure 3D:
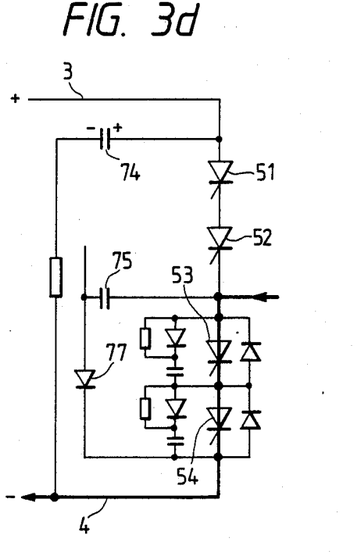

Then, if turn-on signals are applied to the GTOs 53, 54, current starts to flow from the ac load toward the dc power source through the GTOs 53, 54, as shown by a thick line in FIG. 3d. In this manner, the commutation of current from the positive arm to the negative arm is performed.

Referring next to FIGS. 4a to 4d, the commutation operation from the negative arm to the positive arm will be described. In an analogous manner to FIGS. 3a to 3d, these figures show the change of the current flow when current flowing through the GTOs 53, 54 is commutated to the GTOs 51, 52.

Figure 4A:
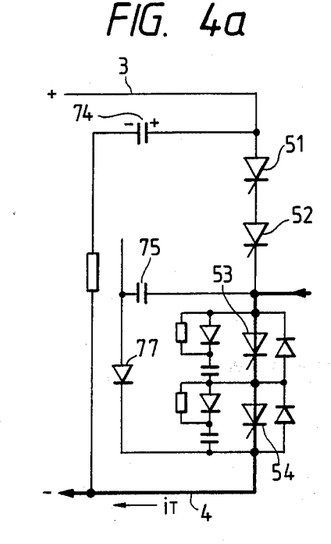
FIGS. 4a to 4d are drawings for explaining the operation of the commutation of current from a negative arm to a positive arm in the rectifying branch.

When the GTOs 53, 54 are conductive, current $i_T$ flows from the ac load to the dc power source through the GTOs 53, 54, as shown by a thick line in FIG. 4a. It is assumed that, under these conditions, turn-off signals are applied to the GTOs 53, 54 simultaneously, but the GTO 53 still remains conductive, whereas the GTO 54 is turned off at once, because of the difference in the turn-off characteristic between the GTOs 53 and 54. As a result, the current $i_T$, which flows through the GTOs 53, 54 just before the commutation operation thereof, flows separately through two circuits, as shown by thick lines in FIG. 4b.

Figure 4B:
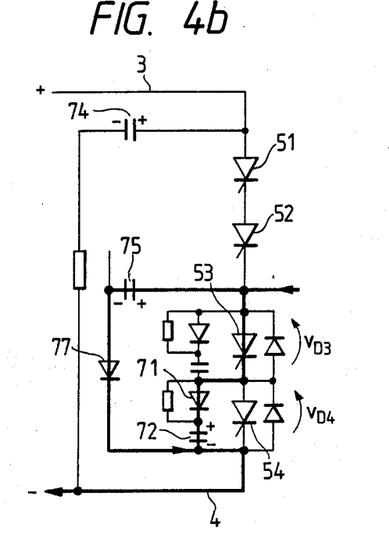

Namely, a part of the current it flows from the ac load to the dc power source through the capacitor 75, the diode 77 and the negative bus 4, whereby the capacitor 75 is charged in the direction as shown. A remaining part of the current $i_T$ flows through the GTO 53, which is still conductive, the diode 71 and the capacitor 72, whereby the capacitor 72 is charged in the direction as shown.

Figure 4C:
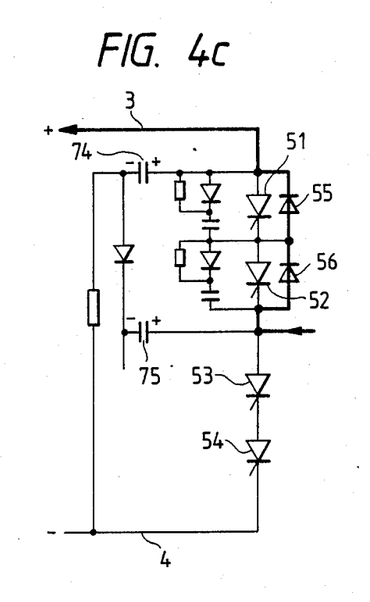
Figure 4D:
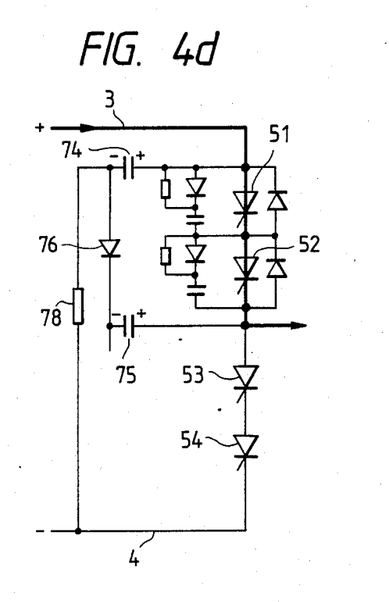

After the turn-off of the GTO 53 is performed, current flows toward the dc power source through the free-wheel diodes 56, 55 due to the inductance of the ac load, as shown by a thick line in FIG. 4c. Then, if turn-on signals are applied to the GTOs 51, 52, current starts to flow from the dc power source to the ac load through the GTOs 51, 52, as shown by a thick line in FIG. 4d. In this manner, the commutation of current from the negative arm to the positive arm is performed.

The commutation from a positive arm to a negative arm as shown in FIGS. 3a to 3d and the commutation from a negative arm to a positive arm as shown in FIGS. 4a to 4d are repeated in every phase of the power converter in response to turn-on or off signals applied to GTOs of the respective phases, whereby the power converter operates as an inverter.

Through this repetitive operation, the energy, which is caused by the inductance of the reactor 6, 7 and the ac load during the commutation from a positive arm to a negative arm and vice versa, is stored mainly in the capacitor 74 or 75 and transferred to the dc power source or the ac load therefrom. On the other hand, the energy, which is caused by the difference of the turn-off time of GTOs within an arm, is absorbed by the capacitor 63, 66, 69 or 72 of the individual snubber circuits.

The energy stored in the capacitors 63, 66, 69, 72 is consumed by the corresponding resistor 61, 64, 67, 70 to become power loss, when the corresponding GTOs 51, 52, 53, 54 are turned on. Since, however, capacitance of the capacitors 63, 66, 69, 72 is considerably small, as will be described later, the energy stored therein is not much. Accordingly, the power loss by the resistor 61, 64, 67, 70 is not large.

Next, there will be discussed the voltages shared by the GTOs 51, 52 or 53, 54 during the commutation operation as described above. As apparent from the foregoing explanation, the imbalance in the voltages shared by the GTOs 51, 52 or 53, 54 occurs in the states as shown in FIG. 3b or FIG. 4b, in which the voltages appearing across the GTOs 51, 52 and 53, 54 are represented by $v_{D1}$, $v_{D2}$ and $v_{D3}$, $v_{D4}$, respectively.

Also it will be apparent that the commutation of current from the positive arm to the negative arm and vice versa is similar in their essence to each other. Accordingly, the description herein will be based mainly on the commutation from the positive arm to the negative arm, any difference relative to the commutation from the negative arm to the positive arm being described as needed.

Figure 5:
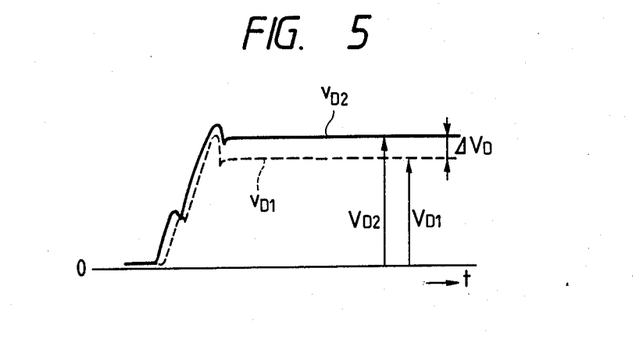
FIG. 5 is a drawing for explaining the imbalance in voltages shared by two GTOs connected in series, which is caused by the difference in the turn-off time thereof.

As shown in FIG. 5, although the voltages $v_{D1}$, $v_{D2}$ appear across the GTOs 51, 52 with a time difference due to the difference of a turn-off time characteristic thereof, both gradually increase thereafter and reach $V_{D1}$, $V_{D2}$, respectively, after the GTOs 51, 52 is completely turned off. The same is applied to the voltages $v_{D3}$, $v_{D4}$ appearing across the GTOs 53, 54 in FIG. 4b.

Unless the phase snubber circuit 73 is provided, a difference $\Delta V_D$ between $V_{D1}$ and $V_{D2}$ is usually represented by the following formula (1):

$$\Delta V_D = \Delta t_{off} \times i_T C_{66} \tag{1}$$

wherein $\Delta t_{off}$ denotes a difference in the turn-off time between the GTOs 51 and 52, and $C_{66}$ capacitance of the capacitor 66 of the individual snubber circuit 59.

By the way, assuming that capacitance of the capacitors 74, 75 of the phase snubber circuit 73 are $C_{74}$ and $C_{75}$, respectively, a synthetic capacitance $C_S$ coupled to the positive arm is represented by the formula (2) below, because the capacitor 66 and the series connection of the capacitors 74, 75 are connected in parallel with each other in the state as shown in FIG. 3b.

$$C_S = C_{66} + C_{74} \times C_{75}/(C_{74} + C_{75}) \tag{2}$$

If, in the formula above, $C_{74}$ is selected to be much larger than $C_{75}$, the synthetic capacitance $C_S$ is approximated by the following formula:

$$C_S \approx C_{66} + C_{75} \tag{3}$$

Further, since there is not included the capacitor 74 in a current path in FIG. 4b, the synthetic capacitance $C_S'$ coupled across the negative arm becomes as follows:

$$C_S' = C_{72} + C_{75} \tag{3'}$$

wherein $C_{72}$ denotes capacitance of the capacitor 72 of the individual snubber circuit 60. Usually, since capacitance of a capacitor included in every individual snubber circuit is selected equally, $C_S'$ given by the formula (3') is equal to $C_S$ given by the formula (3).

Accordingly, when there is provided the phase snubber circuit 73, the voltage difference $\Delta V_D$ becomes as follows:

$$\Delta V_D = \Delta t_{off} \times i_T / C_S \qquad (4)$$

As apparent from the comparison of the formulas (1) and (4), the voltage difference $\Delta V_D$ becomes smaller when the capacitor 75 is provided than otherwise, because $C_S$ (or $C_S'$) is larger than $C_{66}$.

Since the sum of the voltages $V_{D1}$ and $V_{D2}$ is equal to the voltage of the dc power source and therefore constant, the decrease of the voltage difference $\Delta V_D$ means that the imbalance of the voltages shared by the GTOs 51, 52 is reduced. Accordingly, it is prevented that an overvoltage is applied to a particular one of the GTOs during the commutation thereof.

Although capacitance of capacitors of the individual snubber circuits 59, 60 and that of the phase snubber circuit 73 must be determined in dependence on a power converter, an example thereof will be given below. In the phase snubber circuit 73, the capacitance of the capacitor 75 is determined at such a value, e.g., 2 μF, that it can sufficiently absorb the energy discharged from the reactors 6, 7 and the ac load. Capacitance of the capacitor 74 is selected much larger than that of the capacitor 75, e.g., 20 μF, in order to suppress the variation of the voltage appearing across a series connection of the capacitor 74 and the resistor 78 as small as possible.

On the other hand, the energy to be absorbed by the capacitor 63, 66, 69 or 71 of the individual snubber circuits 59, 60 is very small, because it is energy stored in inductance of a wiring of the respective GTO. Therefore, the capacitance of the capacitors 63, 66, 69 and 71 are sufficient to be considerably small, compared with those of the capacitors 74, 75, e.g., about 0.2 μF.

Further, in the construction of the rectifying branch 5 as shown in FIG. 2b, capacitance of the capacitor 79 must be selected much larger than that of the capacitor 75 in the similar manner to the capacitor 74 in FIG. 2a.

In the following, explanation will be made of another embodiment, in which the phase snubber circuit 73 is improved so as to increase the amount of power recovery. FIGS. 6a to 6e show some examples of such an improvement, in which only a pertinent portion of the rectifying branch 5 is shown and the same parts therein are indicated by the same reference numerals as in FIG. 2a.

Figure 6A:
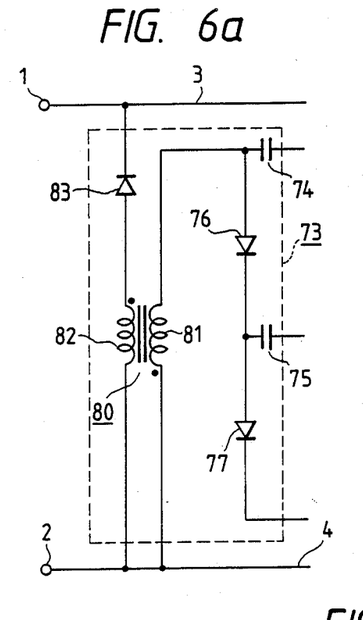
FIGS. 6a to 6e schematically show some modified forms of a pertinent portion of another embodiment of the present invention, which is provided with energy recovery means.

Referring at first to FIG. 6a, there is shown a first improvement, in which the resistor 78 in FIG. 2a is replaced by a transformer 80. A primary winding 81 of the transformer 80 is coupled across the negative bus 4 and the junction of the capacitor 74 and the diode 76, and a secondary winding 82 is coupled between the positive bus 3 and the negative bus 4 through a diode 83.

In the phase snubber circuit 73 as shown in FIG. 6a, the current flowing to the dc power source in the state of FIG. 3c is not through the resistor 78, but through the transformer 80, whereby power loss is much reduced. With this, a further improved low-loss power converter can be realized.

Figure 6B:
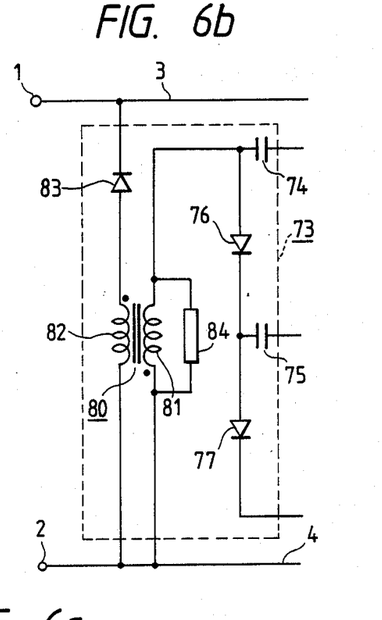

FIGS. 6b to 6e show further improvements, in which there is provided means for attenuating an exciting current flowing through the primary winding 81 so that the magnetic saturation of a core of the transformer 80 is prevented. To this end, in FIG. 6b, there is provided a resistor 84 coupled in parallel with the primary winding 81. This resistor 84 produces a voltage as shown in FIG. 7a and reduces an exciting current $i_0$ to prevent the core from being saturated.

Figure 6C:
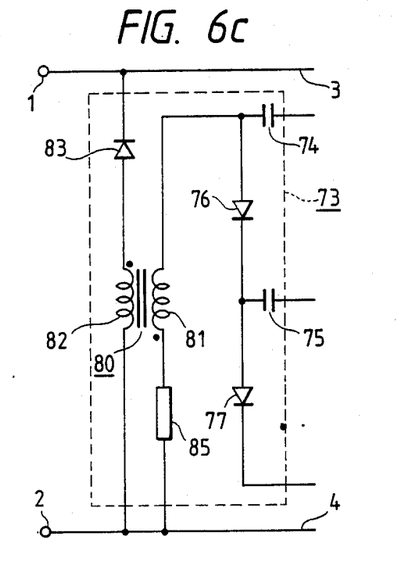
Figure 6D:
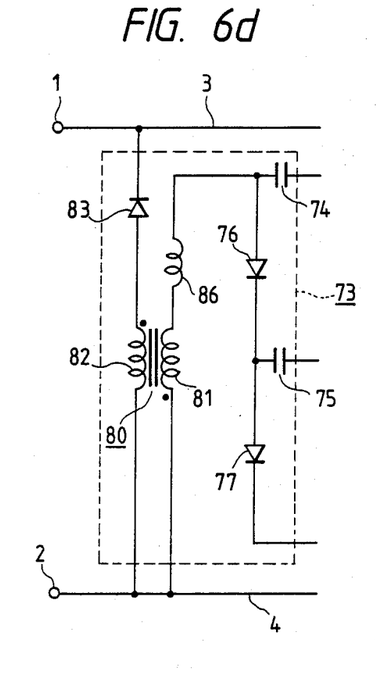
Figure 7A:
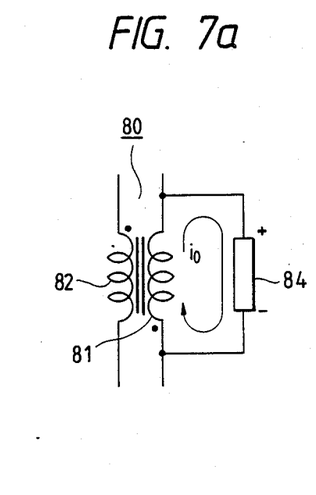
FIGS. 7a and 7b are drawings for explaining further improvements of the energy recovery means.
Figure 7B:
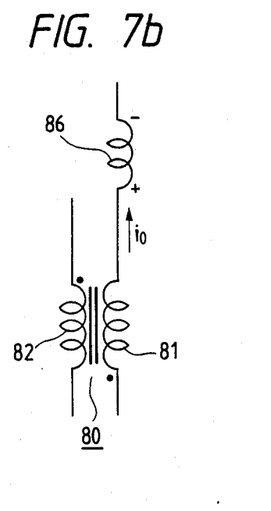

It will be understood that such a reduction of the current $i_0$ can be also achieved by a resistor 85 coupled in series with the primary winding 81, as shown in FIG. 6c. Further, the resistor 85 can be substituted by an inductor 86, as shown in FIG. 6d. The inductor 86 generates a voltage by the current $i_0$ flowing through the primary winding 81 in the direction as shown in FIG. 7b, and the thus generated voltage functions so as to reduce the current $i_0$.

Figure 6E:
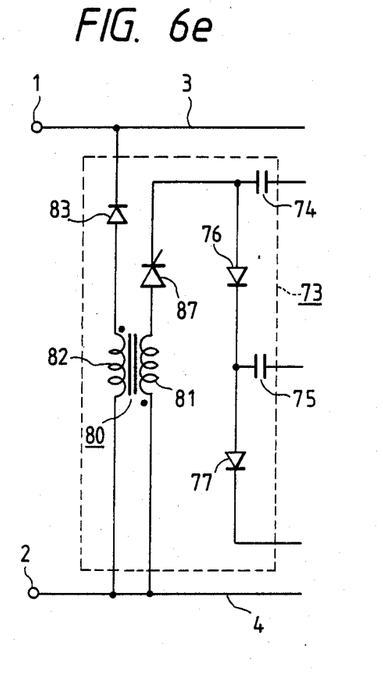

Moreover, in FIG. 6e, there is provided a switching element 87 in series with the primary winding 81, whereby the exciting current of the transformer 80 is forcibly cut off. The switching element 87 is turned on in a predetermined relationship with turn-on off of the GTOs 51, 52 or 53, 54. For example, the switching element 87 is turned on at a predetermined time after the turn-off signals are applied to the GTOs 51, 52. The predetermined time is selected to be almost equalo to a time between the state of FIG. 3a and the state of FIG. 3c.

In FIGS. 6a to 6e, there are shown the examples, in which the transformer 80 as energy recovery means is provided in a phase snubber circuit of the construction as shown in FIG. 2a. However, it will be easily understood that such energy recovery means can be provided in a phase snubber circuit of the construction as shown in FIG. 2b.

Further, FIGS. 6a to 6e show the examples, in which energy recovery means is provided in a phase snubber circuit for every phase of a power converter. Next, description will be made of a power converter according to still another embodiment of the present invention, in which a power converter is provided with single energy recovery means in common to every phase.

Figure 8:
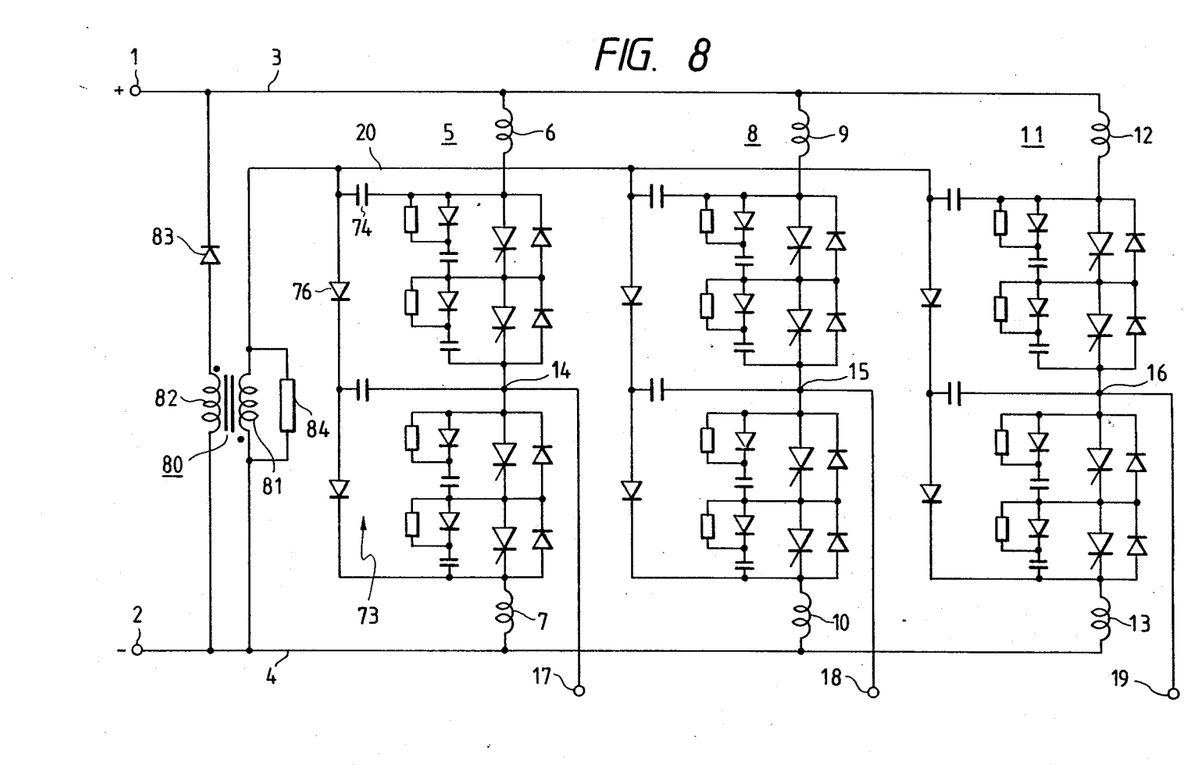
FIG. 8 schematically shows an overall configuration of a power converter according to still another embodiment of the present invention.

FIG. 8 shows an overall configuration of a power converter according to the still another embodiment, in which energy recovery means as shown in FIG. 6b is provided in common to the rectifying branches 5, 8, 11. In this figure, the same parts are indicated by the same reference numerals as in the foregoing figures.

As shown in the figure, the junction of the capacitor 74 and the diode 76 in the phase snubber circuit 73 of the respective phases are connected in common by a line 20. One end of the line 20 is coupled to one end of the primary winding 81 of the transformer 80. The other end of the primary winding 81 is coupled to the negative bus 4. The secondary winding 82 of the transformer 80 is coupled across the positive bus 3 and the negative bus 4 through the diode 83.

The transformer 80 as shown in FIG. 8 functions as common energy recovery means for the phase snubber circuits of the respective phase. With this construction, a power converter, which has a further improved power loss characteristic and is small in size, can be realized.

We claim:
1. An electric power converter having:
   a bridge circuit of plural phases, which includes plural rectifying branches corresponding to the respective phases, which are coupled in parallel across dc terminals of the bridge circuit, wherein each of the rectifying branches comprises:

a first arm and a second arm, both including switching elements, which are connected in series with each other, in which a junction of the series-connected arms is coupled to one of ac terminals of the bridge circuit;

a free-wheel diode coupled in reverse parallel with every switching element of said first and second arms; and a phase snubber circuit provided with a series connection of first and second diodes coupled across the series-connected arms through a first capacitor, in which a junction of the first and second diodes is coupled to the junction of the series-connected arms through a second capacitor and a junction of the first capacitor and the series-connected first and second diodes is coupled to one of the dc terminals through a discharge path, through which charge stored in the first capacitor is discharged, characterized in that the respective arms of each rectifying branch include plural switching elements connected in series, and each of the switching elements is provided with an individual snubber circuit including a third capacitor being charged during turn-off of a corresponding switching element and a resistor for consuming charge discharged from the third capacitor during turn-on of the corresponding switching element, in which the first capacitor has capacitance much larger than the second capacitor, which has capacitance much larger than the third capacitor.

2. An electric power converter as defined in claim 1, wherein said phase snubber circuit is formed such that one end of the first capacitor is coupled to a positive end of a corresponding rectifying branch; the other end of the first capacitor is coupled to one end of the series-connected first and second diodes, the other end of which is coupled to a negative end of the corresponding rectifying branch; and the junction of the first capacitor and the series-connected first and second diodes is coupled to a negative one of the dc terminals through the discharge path.

3. An electric power converter as defined in claim 2, wherein the discharge path comprises power recovery means including a transformer, a primary winding of which is connected between the junction of the first capacitor and the series-connected first and second diodes and the negative dc terminal and a second winding thereof is connected across the dc terminals through a diode.

4. An electric power converter as defined in claim 3, wherein the primary winding is provided with a resistor coupled in parallel therewith.

5. An electric power converter as defined in claim 3, wherein the primary winding is provided with a resistor coupled in series therewith.

6. An electric power converter as defined in claim 3, wherein the primary winding is provided with an inductor coupled in series therewith.

7. An electric power converter as defined in claim 3, wherein the primary winding is provided with a switching element in series therewith, which is turned on in a predetermined relationship with turn-on or off of the switching elements of a corresponding rectifying branch.

8. An electric power converter as defined in claim 2, wherein there is provided a single common discharge path, instead of respective discharge paths in phase snubber circuits of all the phases, and the common discharge path comprises power recovery means including a transformer, in which a primary winding of the transformer is, at one end thereof, connected in common to junctions of first capacitors and series connections of first and second diodes in the respective phases and, at the other end thereof, to the negative dc terminal, and a second winding thereof is connected across the dc terminals through a diode.

9. An electric power converter as defined in claim 1, wherein said phase snubber circuit is formed such that one end of the first capacitor is coupled to a negative end of a corresponding rectifying branch; the other end of the first capacitor is coupled to one end of the series-connected first and second diodes, the other end of which is coupled to a positive end of the corresponding rectifying branch; and the junction of the first capacitor and the series-connected first and second diodes is coupled to a positive one of the dc terminals through the discharge path.

10. An electric power converter as defined in claim 9, wherein the discharge path comprises power recovery means including a transformer, a primary winding of which is connected between the junction of the first capacitor and the series-connected first and second diodes and the positive dc terminal and a second winding thereof is connected across the dc terminals through a diode.

11. An electric power converter as defined in claim 10, wherein the primary winding is provided with a resistor coupled in parallel therewith.

12. An electric power converter as defined in claim 10, wherein the primary winding is provided with a resistor coupled in series therewith.

13. An electric power converter as defined in claim 10, wherein the primary winding is provided with an inductor coupled in series therewith.

14. An electric power converter as defined in claim 10, wherein the primary winding is provided with a switching element in series therewith, which is turned on in a predetermined relationship with turn-on or off of the switching elements of a corresponding rectifying branch.

15. An electric power converter as defined in claim 9, wherein there is provided a single common discharge path, instead of respective discharge paths in phase snubber circuits of all the phases, and the common discharge path comprises power recovery means including a transformer, in which a primary winding of the transformer is, at one end thereof, connected in common to junctions of first capacitors and series connections of first and second diodes in the respective phases and, at the other end thereof, to the positive dc terminal, and a second winding thereof is connected across the dc terminals through a diode.

* * * * *